United States Patent

Poon et al.

(10) Patent No.: US 10,418,877 B2
(45) Date of Patent: Sep. 17, 2019

(54) ENDCAP ASSEMBLY FOR AN ELECTRIC MOTOR AND STATOR COMPRISING SAME

(71) Applicant: JOHNSON ELECTRIC INTERNATIONAL AG, Murten (CH)

(72) Inventors: Kwong Yip Poon, Hong Kong (CN); Jie Chai, Shenzhen (CN); San Yuan Xiao, Hong Kong (CN); Kun Zhou Lu, Shenzhen (CN); Tao Zhang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 200 days.

(21) Appl. No.: 15/435,786

(22) Filed: Feb. 17, 2017

(65) Prior Publication Data

US 2017/0244299 A1  Aug. 24, 2017

(30) Foreign Application Priority Data

Feb. 18, 2016 (CN) .......................... 2016 1 0092346

(51) Int. Cl.
*H02K 5/22* (2006.01)
*H02K 3/50* (2006.01)
*H02K 3/52* (2006.01)

(52) U.S. Cl.
CPC .............. *H02K 5/225* (2013.01); *H02K 3/50* (2013.01); *H02K 3/522* (2013.01); *H02K 2203/06* (2013.01); *H02K 2203/12* (2013.01)

(58) Field of Classification Search
CPC .......... H02K 5/225; H02K 3/522; H02K 3/50; H02K 2203/12; H02K 2203/06

USPC ........................................................... 310/71
See application file for complete search history.

(56) References Cited

U.S. PATENT DOCUMENTS

| 3,984,712 | A | * | 10/1976 | Hill | H02K 3/38 310/71 |
| 6,600,244 | B2 | * | 7/2003 | Okazaki | H02K 3/522 310/71 |
| 6,800,973 | B2 | * | 10/2004 | Futami | H01R 4/2458 310/71 |
| 2004/0007934 | A1 | * | 1/2004 | Michaels | H02K 3/522 310/71 |
| 2005/0285465 | A1 | * | 12/2005 | Jurado | H02K 3/527 310/91 |
| 2009/0102312 | A1 | * | 4/2009 | Tsukashima | H02K 3/522 310/215 |

(Continued)

FOREIGN PATENT DOCUMENTS

| CN | 101449449 A | 6/2009 | |
| EP | 0863601 A1 | * 9/1998 | ............. H02K 3/522 |
| JP | 3430839 B2 | * 7/2003 | ............. H02K 3/522 |

*Primary Examiner* — John K Kim
(74) *Attorney, Agent, or Firm* — Muncy, Geissler, Olds & Lowe, P.C.

(57) ABSTRACT

An endcap assembly for an electric motor and a stator having same are provided. The endcap assembly includes an endcap, a first wire, and two terminals corresponding to the first wire. The two terminals are fixed to the endcap and configured to connect with corresponding windings of the electric motor. The endcap defines a first accommodating groove extending from one terminal to the other terminal. The first wire is received in the first accommodating groove, and two ends of the first wire are electrically connected to the two terminals, respectively.

11 Claims, 6 Drawing Sheets

(56) References Cited

U.S. PATENT DOCUMENTS

2010/0109457 A1* 5/2010 Sugiyama ................ H02K 3/50
                                                    310/71
2012/0286593 A1* 11/2012 Yokogawa ............. H02K 1/278
                                                    310/43
2017/0244299 A1* 8/2017 Poon ........................ H02K 3/50

* cited by examiner

ENDCAP ASSEMBLY FOR AN ELECTRIC MOTOR AND STATOR COMPRISING SAME

CROSS REFERENCE TO RELATED APPLICATIONS

This non-provisional patent application claims priority under 35 U.S.C. § 119(a) from Patent Application No. 201610092346.8 filed in The People's Republic of China on 18 Feb. 2016.

FIELD OF THE INVENTION

This invention relates to electric motors, and in particular, to an endcap assembly of the motor.

BACKGROUND OF THE INVENTION

Electric Motors are widely used in industrial production and various kinds of electric appliances in our lives. A conventional motor includes a stator and a rotor. A rotary shaft is mounted in the rotor and rotates along with the rotor to thereby output power. Some of the conventional motors have a housing and an endcap. A stator core and stator windings wound on the stator core are mounted in the housing. Stator windings of the same phase must be connected together, and a common practice is setting connecting wires on an outer circumferential face of a bobbin (which requires a large radial space), or using PCBA to connect the windings (which increases cost).

SUMMARY OF THE INVENTION

Thus, there is a need for an endcap assembly which makes connection of the windings of the motor more convenient and time-saving.

In one aspect, an endcap assembly is provided which includes an endcap, a first wire mounted in the endcap, and two terminals corresponding to the first wire. The two terminals are fixed to the endcap and configured to connect with corresponding windings of the electric motor. The endcap defines a first accommodating groove therein. The first accommodating groove extends from one of the two terminals to the other of the two terminals. The first wire is received in the first accommodating groove, and two ends of the first wire are electrically connected to the two terminals, respectively.

Preferably, the endcap assembly further comprises a second wire mounted in the endcap and two terminals corresponding to the second wire and configured to connect with corresponding windings of the electric motor. The endcap defines a second accommodating groove therein, the second wire is received in the second accommodating groove, and two ends of the second wire are electrically connected to the two terminals corresponding to the second wire, respectively.

Preferably, the second accommodating groove communicates with and crosses the first accommodating groove, and the endcap assembly includes a separating portion for electrically insulating the first wire from the second wire.

Preferably, the endcap assembly further comprises a third wire mounted in the endcap and two terminals corresponding to the third wire and configured to connect with corresponding windings of the electric motor. The endcap defines a third accommodating groove therein, the third wire is received in the third accommodating groove, and two ends of the third wire are electrically connected to the two terminals corresponding to the third wire, respectively. The third accommodating groove communicates with and crosses the first accommodating groove and/or the second accommodating groove. Bosses are formed at a crossed area between the third accommodating groove and the first accommodating groove and/or a crossed area between the third accommodating groove and the second accommodating groove for electrically insulating the third wire from the first wire and/or the second wire.

Preferably, the endcap forms a bearing seat at a central portion thereof, and the first accommodating groove, the second accommodating groove, and the third accommodating groove surround the bearing seat.

Preferably, the endcap defines a plurality of receiving slots located at the two ends of the first accommodating groove, the two ends of the second accommodating groove, and the two ends of the third accommodating grooves, and communicate with the first accommodating groove, the second accommodating groove, and the third accommodating grooves, respectively, and each of the terminals is received in one of the receiving slots.

Preferably, each receiving slot is located at an edge of the endcap, an outer circumferential surface of the endcap defines an aperture at a location adjacent each receiving slot, and the aperture extends toward the corresponding receiving slot, the terminal includes a connecting plate and a hook, the connecting plate is received in the receiving slot, the hook is at a side of the connecting plate facing to the aperture, and the hook and the connecting plate cooperatively form a slot.

Preferably, the endcap includes a main body and a sidewall at a side of the main body, the receiving slots are defined in an inner side of the main body, an end of the sidewall away from the main body defines a receiving groove adjacent to each receiving slot, and a positioning portion is formed between each two adjacent receiving grooves.

Preferably, two sides of each positioning portion forming the receiving grooves are aslant and wedge-shaped.

Preferably, at least one of the positioning portions forms a protrusion at an inner surface thereof, and the protrusion extends along an axial direction of the endcap.

Preferably, the positioning portion forms a winding portion, a latching groove having an opening is defined by each winding portion, and the opening of the latching groove narrows in an outward direction.

In another aspect, stator is provided which includes the above endcap assembly. The stator includes a stator core and windings, and the endcap assembly is fixed to the stator core.

Preferably, the stator core includes a yoke and at least two teeth extending from the yoke, each two adjacent teeth define a stator slot therebetween, the windings are wound around the teeth, each of the windings has two connecting portions leading out from ends of the winding towards the endcap, the two connecting portions are located at two opposite sides of the winding and lead out from two stator slots which are located at two sides of the corresponding tooth, respectively, and two connecting portions which lead out from the same stator slot are disposed close to each other and connect to one of the terminals.

Preferably, the two connecting portions leading out from the same stator slot are welded or soldered to the corresponding terminal to make the corresponding windings electrically connect with the terminal.

In the stator according to the embodiments of the present invention, the terminals and wires are fixed on the endcap, which makes it convenient to assemble and makes the best use of the space in the endcap, thereby simplifying the connection between the windings and reducing the cost of the motor. In addition, the endcap defines the accommodating grooves therein and the bosses are formed in the accommodating grooves, such that the wires can be distributed orderly in the endcap without contacting with each other, thereby avoiding intertwining of the wires and the risk of short circuit.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component, i.e. indirectly fixed to the another component through a third component. When a component is described to be "connected" to another component, it can be directly connected to the another component or there may be an intermediate component. When a component is described to be "disposed" on another component, it can be directly disposed on the another component or there may be an intermediate component.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
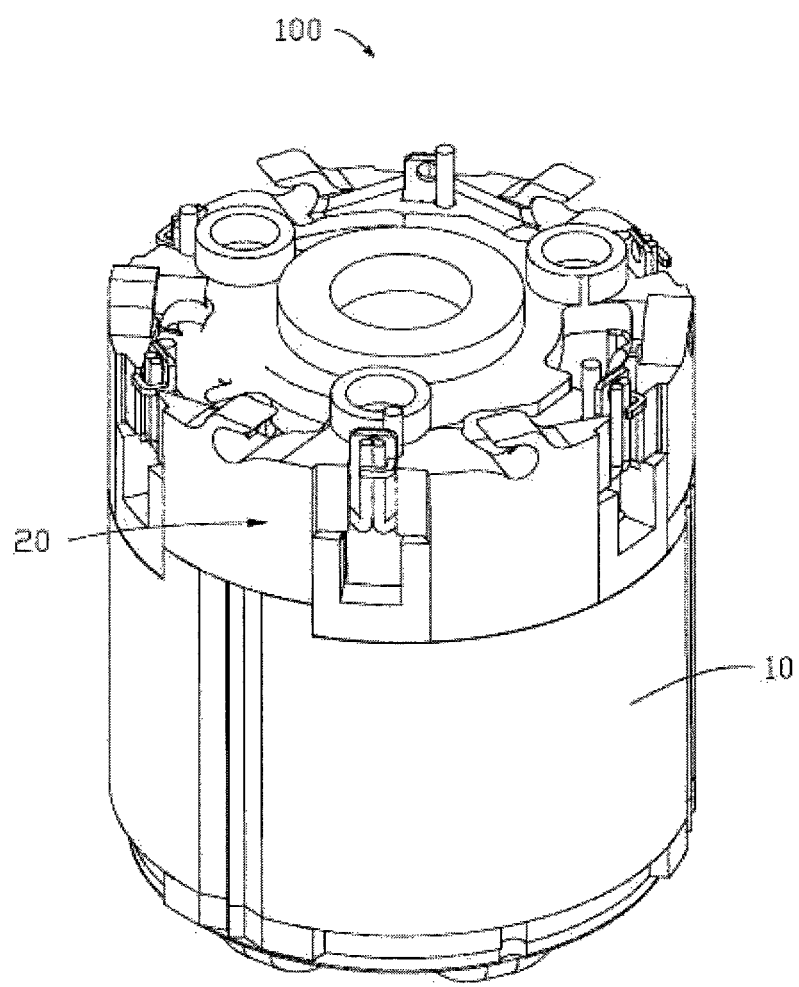
FIG. 1 is an isometric view of a stator according to an embodiment of the present invention.
Figure 2:
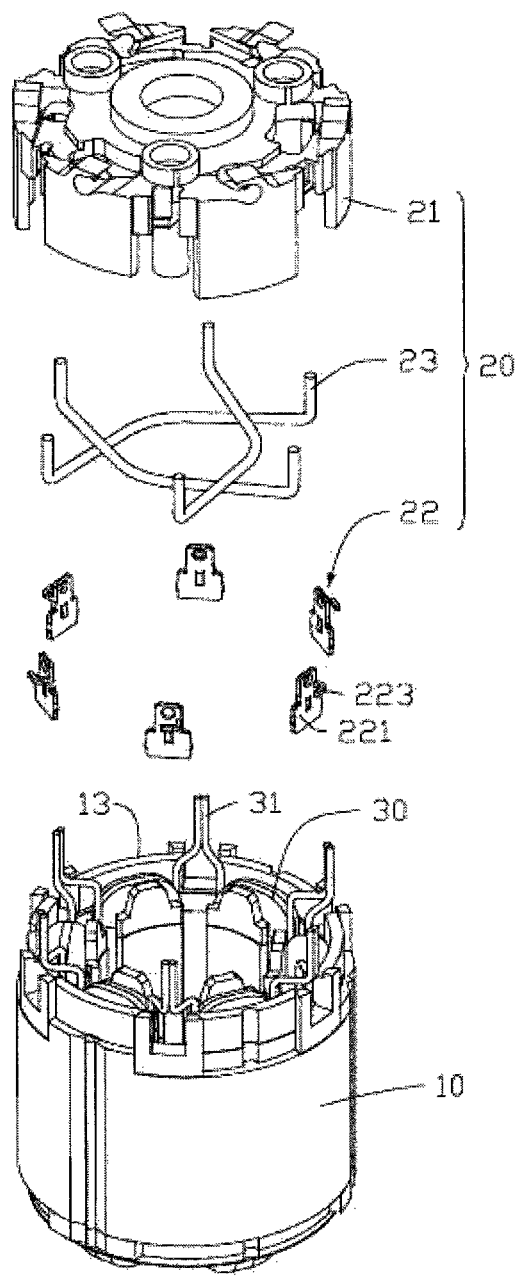
FIG. 2 is an exploded view of the stator of FIG. 1.

Referring to FIGS. 1 and 2, a motor stator 100 according to an embodiment of the present invention includes a stator core 10, an endcap assembly 20, and windings 30 wound on the stator core 10.

Figure 3:
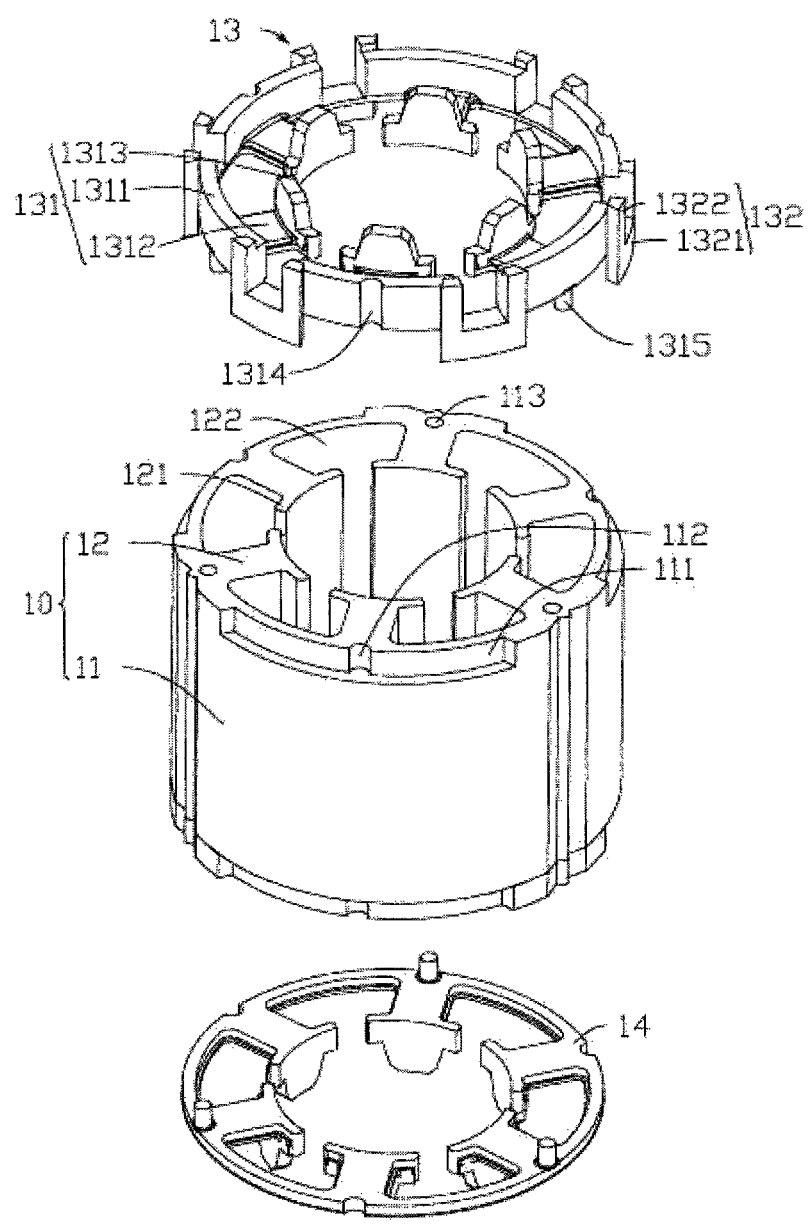
FIG. 3 is an exploded view of a stator core and a bobbin of the stator of FIG. 2.

Also Referring to FIG. 3, the stator core 10 includes a yoke 11 and a plurality of teeth 12 extending inwardly from the yoke 11. An end of the yoke 11 defines a plurality of mounting grooves 111 in an outer circumferential surface thereof. The mounting grooves 111 are evenly spaced from each other. In this embodiment, there are three mounting grooves 111. A first positioning groove 112 adjacent to the tooth 12 is formed in a sidewall of each mounting groove 111. The first positioning groove 112 extends along an axial direction of the stator core 10 and is generally arc-shaped. A positioning hole 113 is formed between each two adjacent mounting grooves 111. In this embodiment, there are three positioning holes 113. The other end of the yoke 11 has substantially the same structure as this end.

Two sides of a distal end of the tooth 12 extend along a circumferential direction of the yoke 11 to form a pole shoe 121. Each two adjacent teeth 12 define a stator slot 122 therebetween. In this embodiment, a stator core 10 with six teeth 12 is taken as an example. The number of the teeth 12 is not limited, and can be adjusted according to needs in other embodiments. The six teeth 12 are wound with six windings 30, respectively. Each of the windings 30 has two connecting portions 31 leading out of the stator core 10 from ends thereof. The two connecting portions 31 are located at two opposite sides of the winding 30, and lead out from two stator slots 122 which are located at two sides of the corresponding tooth 12, respectively. Two connecting portions 31 which lead out from the same stator slot 122 are close to each other.

In this embodiment, the windings 30 are wound on the teeth 12 through a first bobbin 13 and a second bobbin 14. The first bobbin 13 and the second bobbin 14 are mounted at two ends of the stator core 10, respectively.

The first bobbin 13 includes a plurality of bobbin segments 131 and U-shaped blocks 132. The number of the bobbin segments 131 is the same as that of the teeth 12 of the stator core 10. In this embodiment, the number of the bobbin segments 131 is six. Each two adjacent bobbin segments 131 are connected by one U-shaped block 132. Each of the bobbin segments 131 includes an outer wall 1311, an inner wall 1313 and a connecting wall 1312 connecting the outer wall 1311 and the inner wall 1313. Three of the bobbin segments 131 spaced from each other each define a second positioning groove 1314 in an outer side of the outer wall 1311 thereof. The second positioning groove 1314 extends along the axial direction of the stator core 10. During assembly, each of the second positioning grooves 1314 is aligned with one of the first positioning grooves 112 along the axial direction of the stator core 10. The other three spaced bobbin segments 131 each form a positioning post 1315 at an end of the outer wall 1311 thereof which faces to the stator core 10. Each of the positioning posts 1315 is disposed corresponding to one of the positioning holes 113. Each U-shaped block 132 includes a bottom arm 1321 and two connecting arms 1322 at one side of the bottom arm 1321. The two connecting arms 1322 connect to the outer surfaces of the outer walls 1311 of two bobbin segments 131, respectively. The bottom arm 1321 extends beyond the outer wall 1311 of each bobbin segment 131 toward the stator core 10. Each of the bottom arms 1321 abuts against a bottom of the mounting groove 111, and the positioning posts 1315 are inserted into their respective positioning holes 113, such that the first bobbin 13 and the stator core 10 are fixed relative to each other with the first positioning grooves 112 aligned with the second positioning grooves 1314 and an opening of each U-shaped block 132 aligned with one of the stator slots 122. Each U-shaped block 132 has a wedge-shaped cross-section, for engaging with the endcap assembly 20 and the stator core 10. The second bobbin 14 is substantially the same as the first bobbin 13 in structure, but differs from the first bobbin 13 in that the second bobbin 14 does not include the U-shaped block 132 and the outer walls 1311 of the bobbin segments 131 of the second bobbin 14 are directly connected together. The windings 30 are wound on the teeth 12 by winding around the connecting walls 1312 of the bobbin segments 131 of the first bobbin 13 and the second bobbin 14.

Figure 4:
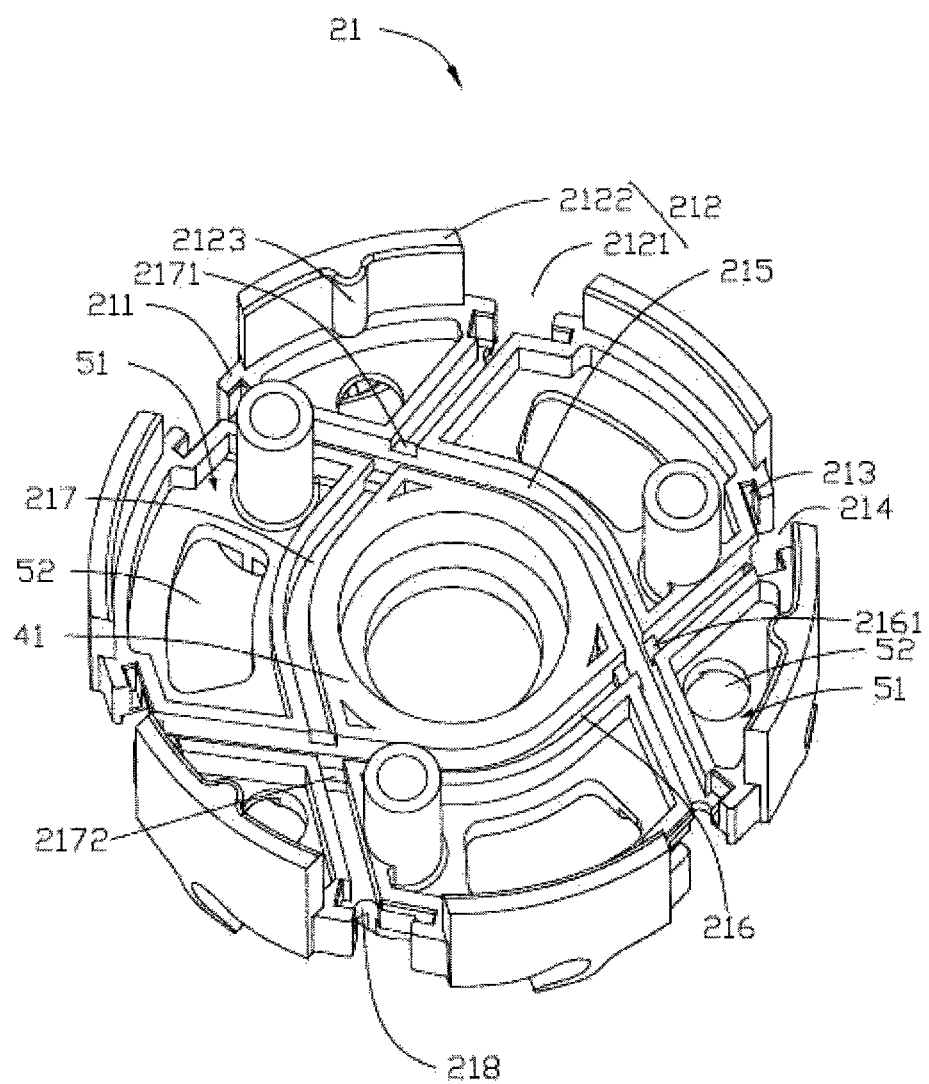
FIG. 4 is an isometric view of an endcap of the stator of FIG. 2.

The endcap assembly 20 includes an endcap 21, and terminals 22 and wires 23 mounted on the endcap 21. Also referring to FIG. 4, the endcap 21 includes a main body 211 and a sidewall 212. The main body 211 is generally circular disc-shaped. The sidewall 212 is generally annular and extends along a circumferential direction of the main body 211. An end of the sidewall 212 away from the main body 211 defines a receiving groove 2121 corresponding to each U-shaped block 132. A positioning portion 2122 is formed between each two adjacent receiving grooves 2121, i.e. the receiving groove 2121 is formed between each two adjacent positioning portions 2122. Two side surfaces of each positioning portion 2122 forming the receiving grooves 2121 are inclined and wedge-shaped, making each receiving groove 2121 have a dovetail configuration for facilitating engagement with the corresponding U-shaped block 132. In this embodiment, the number of the receiving grooves 2121 and the number of the positioning portions 2122 both are six. Three of the positioning portions 2122 spaced from each other form protrusions 2123 at inner surfaces thereof corresponding to the first positioning grooves 112 and the second positioning grooves 1314. The protrusions 2123 extend along an axial direction of the endcap 21. The three positioning portions 2122 with the protrusions 2123 are longer than the other three positioning portions 2122 along the axial direction of the endcap 21. During mounting the endcap 21 to the stator core 10, each of the positioning portions 2122 which have the protrusions 2123 is sandwiched between two neighboring U-shaped blocks 132, and the two adjacent U-shaped blocks 132 abut against two circumferential sidewalls of one mounting groove 111, respectively. A distal end of each positioning portion 2122 abuts against a bottom of one mounting groove 111. The protrusions 2123 are received in corresponding first positioning grooves 112 and second positioning grooves 1314, respectively. Each positioning portion 2122 without the protrusion 2123 is sandwiched between two adjacent U-shaped blocks 132 in two adjacent mounting grooves 111, and abuts against the end surface of the yoke 11 protruding beyond the two adjacent mounting grooves 111.

An edge of the main body 211 defines a receiving slot 213 for receiving the terminal 22 at a location adjacent to each receiving groove 2121. An outer circumferential surface of the main body 211 defines an aperture 214 at a location adjacent to each receiving slot 213. The aperture 214 extends toward the corresponding receiving slot 213. The aperture 214 communicates with and extends through the corresponding receiving slot 213 to divide the receiving slot 213 into two concaves.

The main body 211 forms a bearing seat 41 in a central portion thereof for receiving a bearing therein. The main body 211 further defines a first accommodating groove 215, a second accommodating groove 216, and a third accommodating groove 217 around the bearing seat 41. The first accommodating groove 215, the second accommodating groove 216 and the third accommodating groove 217 are curved and every two of the first to third accommodating grooves cross each other. Each of the accommodating grooves communicates with two symmetric receiving slots 213 that are symmetric with respect to the bearing seat 41. A pair of bosses 2161 is formed in the second accommodating groove 216 at a crossed area between the second accommodating groove 216 and the first accommodating groove 215. The pair of bosses 2161 functions as a separating portion. The pair of bosses 2161 is located at two sides of the first accommodating groove 215, respectively, and adjacent to the first accommodating groove 215. The third accommodating groove 217 has two pair of bosses 2171, 2172 formed therein. One pair of bosses 2171 is formed at a crossed area between the third accommodating groove 217 and the first accommodating groove 215 and located at two sides of the first accommodating groove 215, respectively. The other pair of bosses 2172 is formed at a crossed area between the third accommodating groove 217 and the second accommodating groove 216 and located at two sides of the second accommodating groove 216, respectively. Each end of each accommodating groove defines an arc groove 218 which extends along the axial direction of the endcap 21. The arc groove 218 communicates with one corresponding aperture 214 and extends through the main body 211.

The main body 211 further defines a plurality of recesses 51 therein. A through hole 52 is defined through each recess 51, for facilitating heat dissipation when the motor drives a load.

Figure 5:
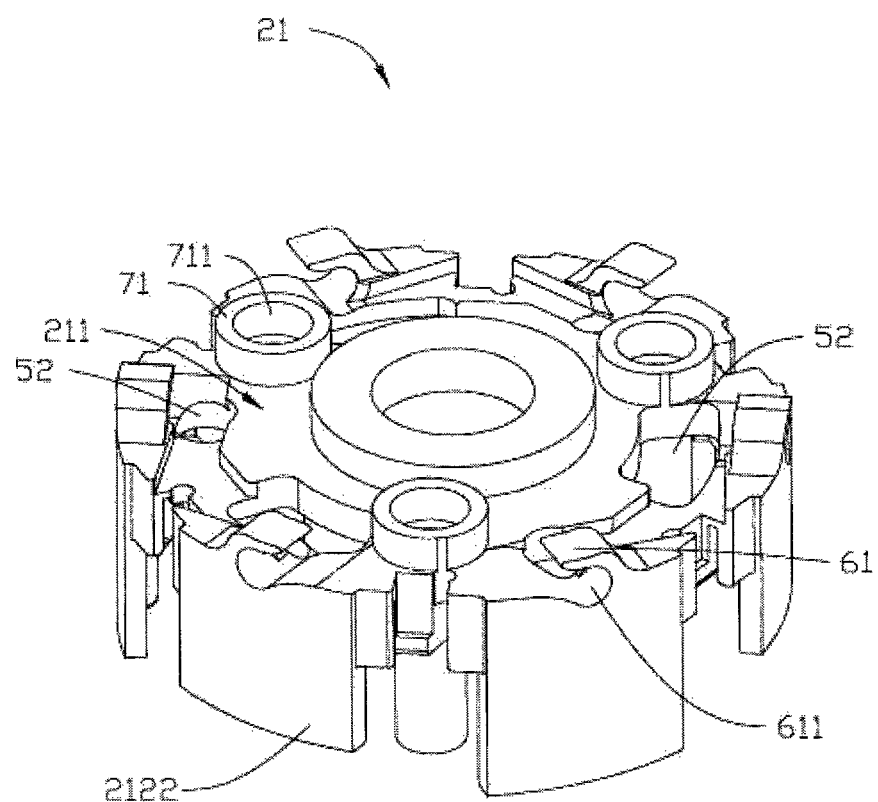
FIG. 5 shows the endcap of FIG. 4 viewed from another angle of view.

Also referring to FIG. 5, the main body 211 forms a plurality of evenly spaced winding portions 61 at an edge of an outer side thereof. Each of the winding portions 61 is curved. A latching groove 611 having an opening is defined by each winding portion 61. The latching groove 611 is generally C-shaped, and the opening thereof narrows in an outward direction of the opening. In this embodiment, the number of the winding portions 61 is six, and each winding portion 61 is disposed on the positioning portion 2122. The winding portion 61 is used for winding of a lead line leading out from the endcap unit 20. The lead line is positioned on the winding portion 64 after being wound one or more turns around the winding portion 61.

The endcap 21 has a plurality of column-shaped locking portions 71 extending through the main body 211. In this embodiment, the number of the locking portions 71 is three, and the three locking portions 71 each define a hole 711 along an axial direction thereof, such that fasteners can extend through the holes 711 and through the stator slots 122 between adjacent teeth 12 to fix to another endcap 21 (not shown), thus fixing the endcap assembly 20 to the stator core 10.

Referring to FIG. 2 again, the number of the terminals 22 is six. Each of the terminals 22 is fixed in one corresponding receiving slot 213 through interference fitting. Each terminal 22 includes a connecting plate 221 and a hook 223 extending from one side of the connecting plate 221. The connecting plate 221 is received in the receiving slot 213. In this embodiment, the upper portion of the connecting plate 221 is narrow than the lower portion of the connecting plate 221. The upper portion of each connecting plate 221 extends through the corresponding receiving slot 213 and beyond the main body 211, and the lower portion of the connecting plate 221 is interference fitted in the corresponding receiving slot 213 to fix the terminal 22 in the receiving slot 213. The hook 223 is located at a side of the connecting plate 221 facing to the aperture 214. In this embodiment, the hook 223 is generally L-shaped, and cooperates with the connecting plate 221 to form a slot (not labeled) therebetween. The two connecting portions 31 leading out from the same stator slot 122 commonly extend through the slot of one terminal 22, and are welded or soldered to the hook 223 to make the corresponding windings 30 electrically connect with the terminals 22, respectively.

The number of the wires 23 is three. The three wires 23 are respectively received in the first accommodating groove 215, the second accommodating groove 216, and the third accommodating groove 217. Two ends of each wire 23 extend through the arc grooves 218 at two ends of the corresponding accommodating groove, respectively, and are electrically connected with corresponding terminals 22 to achieve connection between the corresponding windings 30.

Figure 6:
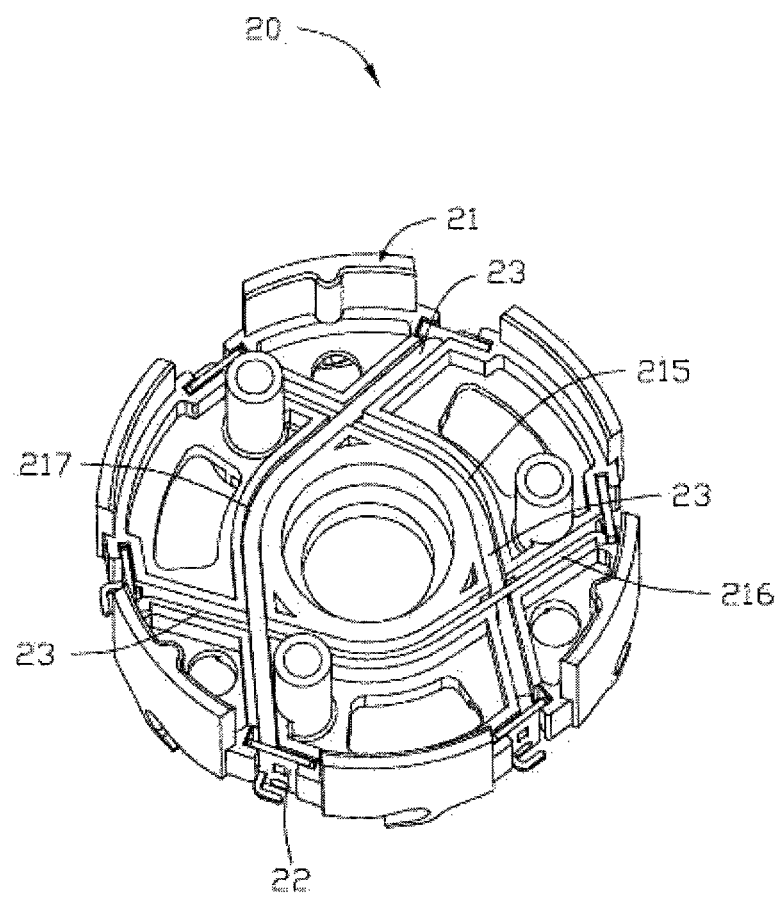
FIG. 6 is an isometric view of an endcap assembly of the stator of FIG. 1.

Also referring to FIG. 6, during assembly, the first bobbin 13 and the second bobbin 14 are mounted to the stator core 10, and each winding 30 is wound on the connecting portions 1312 of the corresponding bobbin segments 131 of the first bobbin 13 and the second bobbin 14. The two connecting portions 31 of two windings 30 leading out from the same stator slot 122 are bent close to each other. One of the wires 23 is disposed in the first accommodating groove 215, and two ends thereof are bent to insert into the arc grooves 218 at two ends of the first accommodating groove 215. Another one of the wires 23 is disposed in the second accommodating groove 216. The pair of bosses 2161 in the second accommodating groove 216 separate the another wire 23 from the wire 23 in the first accommodating groove 215 such that the two wires 23 do not contact with each other. Two ends of the another wire 23 in the second accommodating groove 216 are bent to insert into the arc grooves 218 at two ends of the second accommodating groove 216. The last wire 23 is disposed in the third accommodating groove 217. The two pairs of the bosses 2171, 2172 in the third accommodating groove 217 separate the last wire 23 from the wire 23 in the first accommodating groove 215 and the another wire 23 in the second accommodating groove 216, such that the last wire 23 does not contact with any of the wire 23 and the another wire 23. Two ends of the last wire 23 in the third accommodating groove 217 are bent to insert into the arc grooves 218 at two ends of the third accommodating groove 217. The six terminals 22 are then inserted into their respective receiving slots 213, such that the six terminals 22 are respectively fixed in the receiving slots 213 through interference fitting, and the hooks 223 of the terminals 22 are oriented toward the outer side of the endcap 21. The two connecting portions 31 leading out from the same stator slot 122 extend through the slot of one corresponding terminal 22, and are welded or soldered at the hook 223 to make the corresponding windings 30 electrically connect with the terminals 22, respectively. Two ends of each wire 23 are electrically connected to two terminals 22 in two corresponding receiving slots 213 by welding or soldering, respectively, thereby electrically connecting the two terminals 22. Finally, fasteners extend through the holes 711 and the stator slots 122 between adjacent teeth 12 and are then fixed to the another endcap, such that the endcap assembly 20 is fixed to the stator core 10. Of course, the terminals 22 and the wires 23 may be assembled in a different order. For example, after assembly of one wire 23, the two terminals 22 connected to the wire 23 can be immediately assembled to the endcap 21.

After connection between the corresponding windings 30 is completed, a lead line is led out from each of three adjacent terminals 22, for connecting with an external power supply.

In the stator 100 according to the embodiments of the present invention, the terminals and wires are fixed on the endcap, which makes it convenient to assemble and makes the best use of the space in the endcap, thereby simplifying the connection between the windings and reducing the cost of the motor. In addition, the endcap defines the accommodating grooves therein and the bosses are formed in the accommodating grooves, such that the wires can be distributed orderly in the endcap without contacting with each other, thereby avoiding intertwining of the wires 23 and the risk of short circuit. The design of the embodiments of the present invention is suitable for various electronic devices, such as for a brushless DC motor of a small electric drill.

It should be understood that, the numbers of the teeth 12 of the stator core 10 and the terminals 22 on the endcap assembly 20 are not limited to six as in this embodiment, and for example can be four. In this case, the endcap assembly 20 has two wires 23, the endcap 21 defines two accommodating grooves, and each wire 23 is received in one corresponding accommodating groove and electrically connects to two terminals 22. For another example, the endcap assembly 20 can have only one wire 23, the endcap 21 defines one accommodating groove, and the wire 23 is received in the accommodating groove and electrically connects to two terminals 22.

It should be understood that, the endcap 21 can include only the main body 211, with the sidewall 212 being omitted. In this case, the terminals 22 can be directly fixed to a circumferential surface of the main body 211.

It should be understood that, the endcap assembly 20 and the stator core 10 can be connected by other means, such as by snap-fit connection or screw connection.

It should be understood that, instead of forming the accommodating grooves in the main body 211 for receiving the wires 23, wire clips can be arranged on the main body 211 along the path of the wires 23 to fix the wires 23 on the main body 211.

The embodiments described above are preferred embodiments of the present invention, and should not be used to limit the scope of the present invention in any way. Various other modifications can be apparent to persons skilled in the field without departing from the scope of the invention, and all of such modifications should fall within the scope of the present invention.

The invention claimed is:

1. An endcap assembly for an electric motor comprising:
    an endcap defining a first accommodating groove therein;
    a first wire received in the first accommodating groove; and
    two terminals corresponding to the first wire, fixed to the endcap and configured to connect with corresponding windings of the electric motor;
    wherein the first accommodating groove extends from one of the two terminals to the other of the two terminals, and two ends of the first wire are electrically connected to the two terminals corresponding to the first wire, respectively;
    wherein the endcap assembly further comprises a second wire and two terminals corresponding to the second wire and configured to connect with corresponding windings of the electric motor, the endcap defines a second accommodating groove therein, the second wire is received in the second accommodating groove, and two ends of the second wire are electrically connected to the two terminals corresponding to the second wire, respectively; and
    wherein the second accommodating groove communicates with and crosses the first accommodating groove, and the endcap assembly includes a separating portion for electrically insulating the first wire from the second wire.

2. The endcap assembly of claim 1, wherein the endcap assembly further comprises a third wire and two terminals corresponding to the third wire and configured to connect with corresponding windings of the electric motor, the endcap defines a third accommodating groove therein, the third wire is received in the third accommodating groove, and two ends of the third wire are electrically connected to the two terminals corresponding to the third wire, respectively, the third accommodating groove communicates with and crosses the first accommodating groove and/or the second accommodating groove, and bosses are formed at a crossed area between the third accommodating groove and the first accommodating groove and/or a crossed area between the third accommodating groove and the second accommodating groove for electrically insulating the third wire from the first wire and/or the second wire.

3. The endcap assembly of claim 2, wherein the endcap forms a bearing seat at a central portion thereof, and the first accommodating groove, the second accommodating groove, and the third accommodating groove surround the bearing seat.

4. The endcap assembly of claim 2, wherein the endcap defines a plurality of receiving slots located at the two ends of the first accommodating groove, the two ends of the second accommodating groove, and the two ends of the third accommodating groove, and communicate with the first accommodating groove, the second accommodating groove, and the third accommodating grooves, respectively, and each of the terminals is received in one of the receiving slots.

5. The endcap assembly of claim 4, wherein each of the receiving slots is located at an edge of the endcap, an outer circumferential surface of the endcap defines an aperture at a location adjacent each receiving slot, and the aperture extends toward the corresponding receiving slot, the terminal includes a connecting plate and a hook, the connecting plate is received in the receiving slot, the hook is located at a side of the connecting plate facing to the aperture, and the hook and the connecting plate cooperatively form a slot.

6. The endcap assembly of claim 5, wherein the endcap includes a main body and a sidewall at a side of the main body, the receiving slots are defined in an inner side of the main body, an end of the sidewall away from the main body defines a receiving groove adjacent to each receiving slot, and a positioning portion is formed between each two adjacent receiving grooves.

7. The endcap assembly of claim 6, wherein at least one of the positioning portions forms a protrusion at an inner surface thereof, and the protrusion extends along an axial direction of the endcap.

8. The endcap assembly of claim 6, wherein the positioning portion forms a winding portion, a latching groove having an opening is defined by each winding portion, and the opening of the latching groove narrows in an outward direction.

9. A stator comprising:
a stator core;
windings wound on the stator core; and
an endcap assembly fixed to the stator core, the endcap assembly comprising:
an endcap defining a first accommodating groove therein;
a first wire received in the first accommodating groove; and
two terminals fixed to the endcap and connected with corresponding windings of the electric motor;
wherein the first accommodating groove extends from one of the two terminals to the other of the two terminals, and two ends of the first wire are electrically connected to the two terminals corresponding to the first wire, respectively;
wherein the endcap assembly further comprises a second wire and two terminals corresponding to the second wire and configured to connect with corresponding windings of the electric motor, the endcap defines a second accommodating groove therein, the second wire is received in the second accommodating groove, and two ends of the second wire are electrically connected to the two terminals corresponding to the second wire, respectively; and
wherein the second accommodating groove communicates with and crosses the first accommodating groove, and the endcap assembly includes a separating portion for electrically insulating the first wire from the second wire.

10. The stator of claim 9, wherein the stator core includes a yoke and at least two teeth extending from the yoke, each two adjacent teeth define a stator slot therebetween, the windings are wound around the teeth, each of the windings has two connecting portions leading out from ends of the winding towards the endcap, the two connecting portions are located at two opposite sides of the winding and lead out from two stator slots which are located at two sides of the corresponding tooth, respectively, and two connecting portions which lead out from the same stator slot are disposed close to each other and connect to one of the terminals.

11. The stator of claim 10, wherein the two connecting portions leading out from the same stator slot are welded or soldered to the corresponding terminal to make the corresponding windings electrically connect with the terminal.

* * * * *